June 2, 1936. E. R. GREER 2,042,780
VEHICLE
Filed Feb. 10, 1934
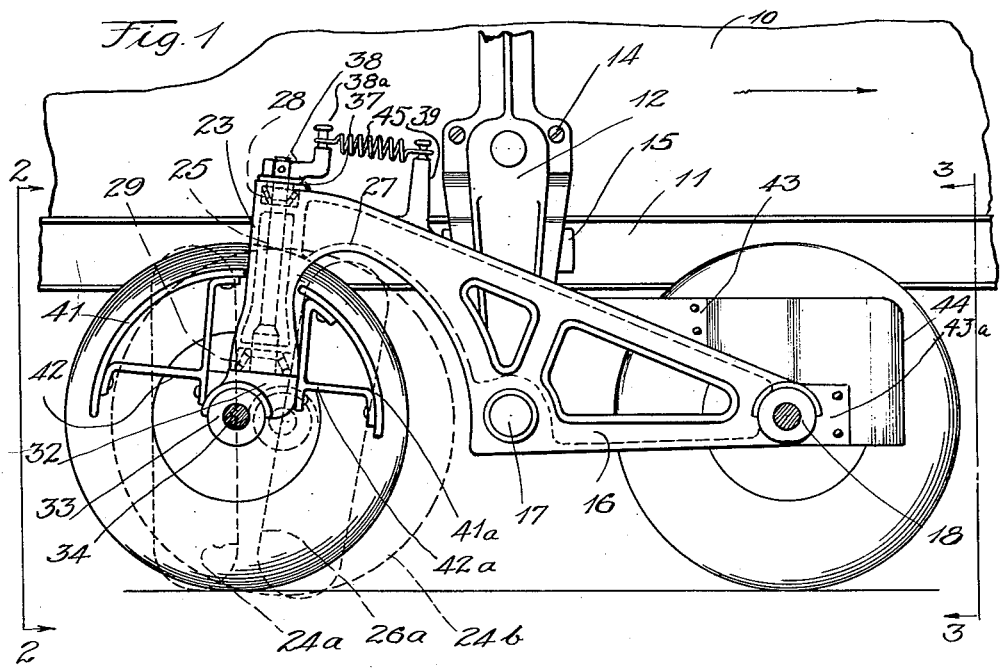
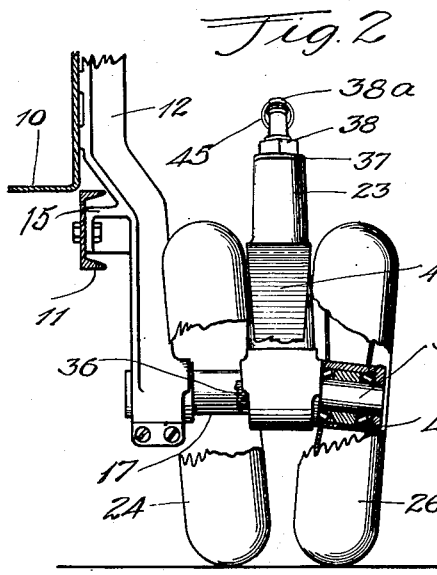
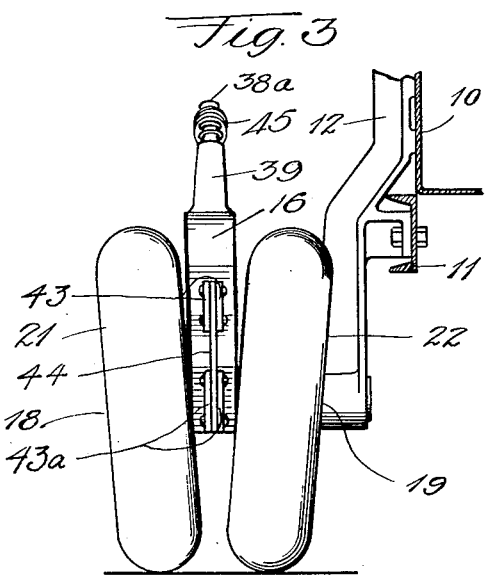
INVENTOR.
EDWARD R. GREER
BY Flournoy Corey
ATTORNEY.

Patented June 2, 1936

2,042,780

UNITED STATES PATENT OFFICE 2,042,780

VEHICLE

Edward R. Greer, Cedar Rapids, Iowa, assignor to La Plant-Choate Manufacturing Company, Incorporated, Cedar Rapids, Iowa, a corporation of Delaware Application February 10, 1934, Serial No. 710,633

3 Claims. (Cl. 280—80)

This invention relates to wagons and has particular relation to the supporting structure whereby the wagon box is supported on the ground to render it mobile.

Wagons of the type in which I am now interested are usually constructed of steel and are adapted to carry heavy loads and consequently weigh between fifteen and twenty tons in loaded condition. They must be adapted to carry these heavy loads over rough ground without an undue expenditure of power for overcoming friction and the drag imposed by the soft ground over which the wagon must travel.

One of the ways of meeting these requirements is to use a pair of endless chain tracks which afford large carrying or contact surfaces on the ground to spread the load over relatively large surfaces to that the unit loading on the ground surface is relatively low. It has also been proposed that a pair of large pneumatic tires be employed instead of the endless track units.

The first method of carrying the load has the disadvantages of relatively high initial cost and a relatively high upkeep or maintenance cost, because of wearing of the parts of the track units. Furthermore, the endless track units offer high resistance to turning movements of the tractor or other towing vehicle because the edges of that part of the track which is in contact with the ground dig into the ground. Furthermore, if one of the track units encounters an obstacle the load is raised to at least one-half the height of the obstacle by reason of the rigidity of that portion of the track which is in contact with the ground.

A wagon utilizing large pneumatic tires also has several disadvantages. The loads which they have to carry are so great that the tires themselves have to be specially built and are of unusually large size, thus resulting in a high initial cost. They, too, raised the load to almost one-half the height of the obstacle unless the tires were of the extremely expensive, low-pressure type.

It is a general object of my invention to overcome the difficulties above enumerated and to provide a mobile supporting means for wagons of this type, in which the load is distributed over large ground surfaces and in which the resistance to turning is minimized.

Another object of my invention is to provide a relatively large number of wheels and tires of relatively small commercial size.

Another object of my invention is to provide a load carrying system such that when the vehicle passes over an obstacle the load is raised only a small fractional part of the height of the obstacle.

Another object of my invention is to provide a load carrying means and a load distributing means which has a relatively large number of contact areas, and in which the load is substantially equally divided on each of these contact areas even when the vehicle is passing over rough terrain.

An important object of my invention is to provide means for cleaning the wheels of dirt or like material which may adhere thereto.

Another important object of my invention is to provide means for preventing dirt or like material from falling in between the wheels.

Another object of my invention is to provide, in a multi-wheel load carrying means, means for keeping the wheels in line while they are moving in a direction parallel to the longitudinal axis of the wagon box.

Another object of my invention is to provide means for causing some of the wheels to turn about a vertical pivot if the wagon is moved to one side or the other of its longitudinal axis.

Another object of my invention is to provide, in a multiple wheel structure, means whereby a relatively wide and strong supporting structure may be employed without unduly separating the wheels at the points where they are in contact with the ground.

An important feature of my invention is the angular position of the wheels both in castor and in the relative planes of the wheels.

Other and further objects and features of my invention will be more apparent to those skilled in the art upon a consideration of the accompanying drawing and following specification, wherein is disclosed a single embodiment of the invention, with the understanding, however, that such changes may be made therein as fall within the scope of the appended claims without departing from the spirit of the invention.

In said drawing:

Figure 1 is a view in side elevation of a device constructed according to one embodiment of my invention.

Figure 2 is a view partly in section and partly in rear elevation of the device shown in Figure 1, and Figure 3 is a view in front elevation of the device shown in Figure 1.

There is shown at 10, generally, a wagon box or hopper in which the load of dirt or like material is to be carried. These hoppers are provided with dump doors and a dump door operating mechanism (not shown) for dumping the load, and the hopper 10 is preferably surrounded at its lower edge by a box frame 11. A pair of brackets or legs 12 are attached to the frame 11 and hopper 10 by a pillow block 15 and bolts or rivets 14, with one leg on each side of the wagon depending downwardly from the frame 11 and box 10, so that the hopper 10 is supported in an elevated position to permit dumping of the load. This much of the structure is substantially the same as that shown in Patent No. 2,029,093 to Roy E. Choate et al., and since this structure forms no part of my present invention except in relation to the structure hereinafter described, it need not be further described at the present time.

A rocking beam or chassis beam 16 is fastened to stub shafts 17 which project outwardly from, and are secured to, the lower extremities of the legs 12, that is, with one beam on each side of the wagon. These rocking beams are roughly triangular in shape with the apex of the inverted triangle at the stub shafts 17, and with one corner of the triangular rocking beam member extending forwardly, to afford means for the attachment of a pair of laterally projecting stub axles 18 and 19, on which the front wheels 21 and 22, respectively, are journaled. The roughly triangular rocking beams may be said to be in an inverted or base-up position, since the longest side of the beams are above and the apex is below the centers of mass of the beams.

The other corner of the rocking beam 16 projects rearwardly and is then extended downwardly to form a cylindrical-shaped castor spindle support 23. The under face of this rearwardly extending portion of the beam 16 is curved, as indicated at 27, in order that the rear wheels 24 and 26, the mounting of which will be hereinafter explained, may swivel about under the rearwardly extending portions of the beams.

A castor spindle 25 passes downwardly through the support 23 and this spindle may rotate about in the support, and is rotatably engaged therein by means of roller thrust anti-friction bearings 28 and 29 at the upper and lower ends, respectively.

The castor spindle 25 is enlarged at its lower end, as indicated at 32, just below the support and has a rearwardly projecting or extending portion 33 which affords a support for laterally projecting twin rear wheel stub shafts 34 and 36, on which the trailing or castor wheels 24 and 26 are rotatably mounted. The spindle 25 is held in place within the spindle support by means of the enlargement 32 at the lower end thereof, and the disc washer 37 and crank 38 at the upper end thereof. The crank 38, of course, turns with the spindle 25 and, in the normal position of the castor wheels, projects toward the central part of the rocking beam 16 and is in the same plane therewith. The purpose of this crank is to provide a fulcrum to which biasing means may be applied for normally holding the castor wheels in trailing relation to the front wheels. In order to apply a biasing action to the crank 38 I may provide a post 39 on top of the rear portion of the rocking beam 16 and a spring 45 between the post and the outer end 38a of the crank. The biasing action of the spring on the crank assists to hold the wheels steady in their trailing position, but when the wagon is turned or its direction of travel reversed the spring stretches to permit pivoting about of the castor wheels.

It will be noted that the spindle and the spindle support are inclined rearwardly, that is, with the lower portion of these members further to the rear than the top portion thereof. This condition may be termed "castor". It is preferable that the center line of the spindle and a vertical transverse plane passing through the stub axles should intercept at a point below the lowermost portion of the wheel, that is, below the surface of the ground upon which the wagon is resting.

The wheels themselves may be of any suitable construction, but are preferably of the disc type in order to prevent dirt or clay from "balling up" in the wheels. The usual anti-friction wheel bearings 40 may be used. Pneumatic tires of the standard sizes such as used in connection with heavy trucks and trailers, that is, the so-called "commercial" sizes, are located on the wheels in the usual manner of such mountings. The inclination of the spindle 25, the cooperative relation of the stub shafts and the biasing action of the spring are of importance in making the wheels "track" well without being too sensitive to "wobble" and yet permit the castor wheels to swivel or pivot about freely in the event that the wagon is turned around or its direction of movement reversed. It is to be noted in this connection, that if the castor wheels are rotated through 180° as they would be if the direction of movement of the wagon is reversed, the castor or trailing end of the beam 16 will actually be raised. It is apparent therefore that the load of the wagon and contents causes the wheels normally to assume a position with the offset portion of the castor spindle extending toward the rear.

Both the leading and trailing or castor wheels are given a decided opposed inclination or "camber" so that the bottom portion of the respective wheels are closer together than are the top portions. Stating the point in different words, planes passing through the wheels would intersect at a point or at a line well below the surface of the ground. There are several reasons for this construction. By causing the wheels to assume this angular relation I am enabled to employ a strong heavy broad castor spindle and castor spindle support and yet have the wheels close together near the surface of the ground. Furthermore, I am enabled to locate fenders or the like between these respective pairs of wheels, as indicated at 41, to prevent dirt or like material from falling in between the wheels, and to assist in clearing the wheels of any material which may adhere thereto, particularly at the tires. Another advantage of inclining the wheels to each other in this manner is that rocks, lumps of clay or the like which are wedged between the wheels at the bottom thereof, as the wheels pass over the ground, are released as the wheels rotate and fall out from between them. I have found too that it is of material advantage that the pairs of wheels be slightly "toed in" toward each other so that the wheels are actually closer to each other at a point somewhat ahead of the vertical plane through the wheel stub axles.

The fenders 41 and 41a, for the castor wheels, may be flat curved members supported between the tires of wheels 24 and 26 by means of suitable brackets, such as the brackets 42 and 42a, which are in turn fastened on the castor swivel 32. If desired, however, a flat vertically-extending plate similar to the one I am about to describe in connection with the front wheels may be mounted on the castor swivel in place of the fenders 41 and 41a.

I may employ a vertically extending flat plate 44 in connection with the front wheels 18 and 19 for dislodging material from the wheels and the tires on the wheels. This plate is preferably secured to the front end of the rocking beam 16 as by means of ears 43 and 43a on the upper face and front end of the forward portion of the beam 16, respectively. At the lower edge of the plate 44 the space from either face of the plate to the tires is less than the space between the tires at the ground and therefore material which falls between the plate and the tires will fall through the space between the tires and to the ground.

It is apparent that as the wagon is drawn forwardly in the direction indicated by the arrow in Figure 1 the castor swivel 32 will be in a trailing position, with the wheels 24 and 26 in their trailing position as indicated in full lines in Figure 1. If the wagon is pulled to one side or the other the castor wheels 24 and 26 will swivel about on the castor spindle support by reason of the castor spindle and will assume some such position as indicated by the dotted lines 24a and 26a or some position between the full trailing position and the turning position according to how sharp a curve is being turned. If the direction of movement of the wagon is reversed from its normal forward movement the castor wheels will assume a position at 180° with reference to their full trailing position, as indicated by the dotted line 24b, with the wheels extending under the arched portion 27 of the beam 16. By reason of the inclination or castor of the castor spindle and the biasing action of spring 45 the castor wheels are in a more stable condition when the wagon is being towed in the direction as indicated by the arrow in Figure 1. It is apparent however that the wagon may be turned to one side or the other, or its direction of movement reversed, and the castor wheels will swivel about freely so that the turning or reversing movement is accomplished with a minimum of friction and without any of the wheels digging into the ground.

It is apparent also that if one or both of the front wheels meet an obstruction the rocking beam 16 will pivot about on the stub shaft 17 to result in raising the stub shaft 17 only one-half the height of the obstruction. Inasmuch as the pneumatic tires themselves absorb a considerable portion of the lift it is apparent that the stub shaft 17 will, in actuality, rise much less than one-half the height of the obstacle. If the stub shaft 17 rises, the load itself will be tilted about the stub axle on the other side of the wagon so that the center of the mass of the wagon and load will rise only one-half of the distance the stub axle 17 rises. It is apparent therefore that if any of the wheels pass over an obstacle the load itself will rise only a small fractional part of the height of the obstacle. Of course the same condition applies in passing over a depression in the surface of the ground.

It is apparent therefore that with this method of supporting a wagon or the like the wagon may be moved over very rough ground without material movement of the load up and down. It is apparent also that clay, rocks and the like will not stick to the wheels and will readily be dislodged therefrom. It is apparent that the wagon may be moved ahead, reversed or turned to one side or the other without introducing material increases in friction or resistance to these motions. The device utilizes tires of commercial sizes and thus the initial and maintenance costs are relatively low.

It is apparent that modifications may be made by those skilled in the art. Such modifications may be made without departing from the spirit and scope of my invention as set forth in the appended claims.

I claim as my invention:

1. In a vehicle, a rocking beam pivotally attached to the body of the vehicle, running gear attached to the rocking beam comprising pairs of ground engaging wheels, each pair of wheels having cambered relation to each other, means whereby one of each pair of wheels so connected is mounted for castor movement, comprising a castor spindle support and a castor spindle, the castor spindle having at its lower extremity an integral rearwardly extending support for stub axles so that a center line through the spindle and a vertical plane through the stub axles will intersect at a point below the bottom of the ground engaging wheels.

2. In a vehicle, a vehicle running gear comprising a rocking beam pivotally attached to the body of the vehicle, a pair of ground engaging wheels having cambered relation to each other rotatably attached to the front of the rocking beam, means for rotatably attaching another pair of wheels having cambered relation to each other at the rear of the rocking beam for castor movement about an inclined axis comprising a spindle support, a spindle, the spindle having at its lower extremity an integral rearwardly extending support for the stub axles of the wheels and a biasing means comprising a crank at the upper extremity of the spindle, a post on the rocking beam, and a connecting spring.

3. A vehicle supporting running gear comprising pairs of ground engaging wheels each pair of wheels having cambered relation to each other, a rocking beam connecting the wheels whereby they may move in a substantially vertical relation with respect to each other, and means whereby one of each pair of wheels so connected is mounted for castor movement about an inclined axis comprising a spindle support and a spindle having at its lower extremity an integral rearwardly extending support for the stub axles of the wheels.

EDWARD R. GREER.